United States Patent Office 3,338,657
Patented Aug. 29, 1967

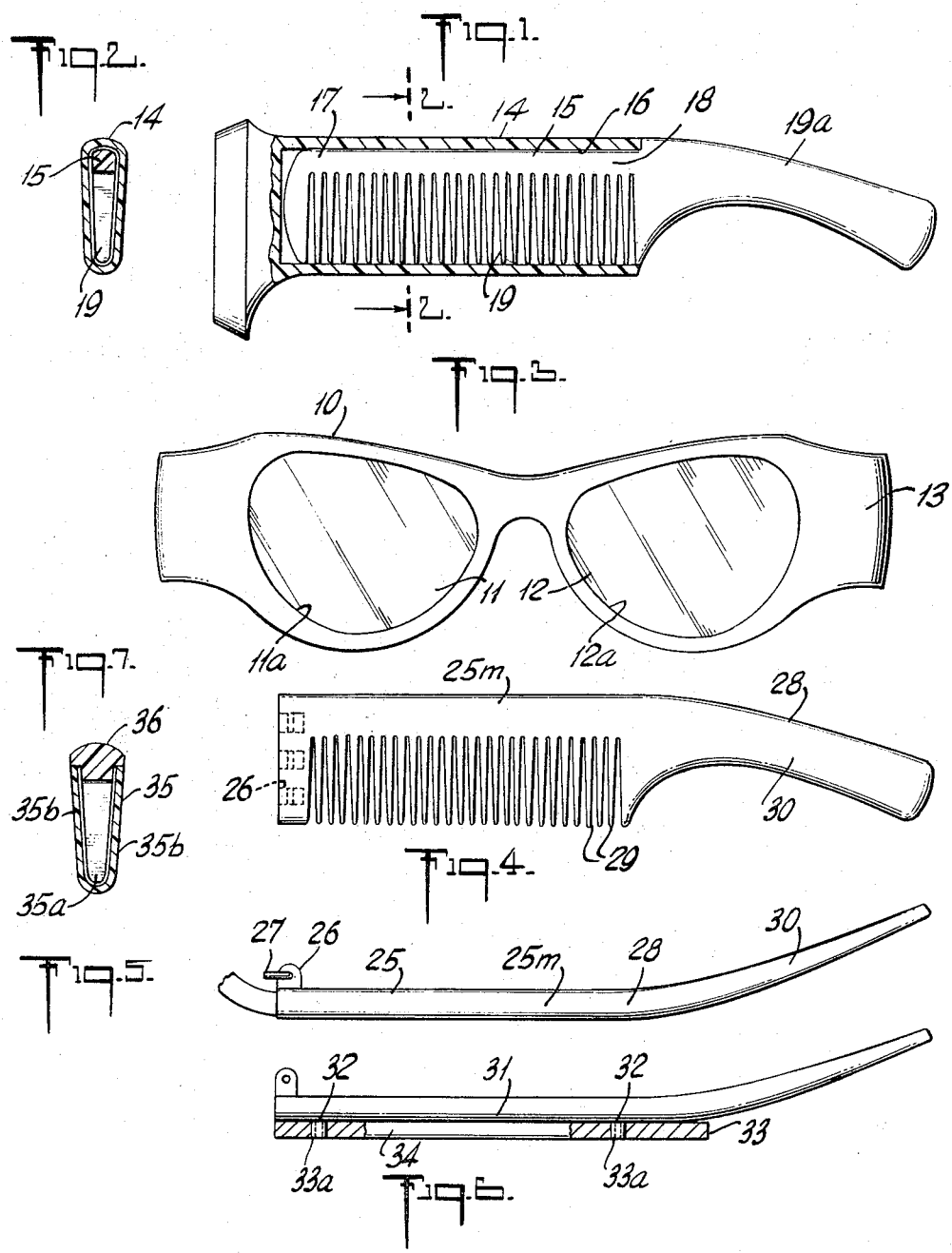

3,338,657
COMBINED SUNGLASSES AND HAIR COMB
Theodore Ristorcelli, Thornwood, N.Y.
(14 Devoe Place, Chappaqua, N.Y. 10514)
Filed Nov. 22, 1963, Ser. No. 325,537
2 Claims. (Cl. 351—158)

ABSTRACT OF THE DISCLOSURE

An eyeglass frame which has a central frame provided with lenses and temple bars with one of the temple bars being shaped to form a pocket or storage compartment for the reception and storage therein of an article such as a hair comb which is removable from the pocket and includes a portion which extends rearwardly from the pocket and acts as an ear hook for the temple bar when the article is stored in the pocket.

---

This invention relates to a combined sunglasses unit and a comb for correcting a hair condition of the user of the sunglasses and one of the objects of the invention is to provide a sunglasses set or unit with temple bar of tubular construction having a comb fitted therein and provided with an ear engaging rear end hook, for holding the frame on the head of the user.

Another object of the invention is to provide an eyeglass frame with temple bar having a longitudinal pocket and a comb which is snugly fitted in this pocket and detachable from the pocket to be usable independently of the eyeglass unit.

Another object of the invention is to provide one of the temple bars with a comb which can be used when detached from the frame of the sunglasses to comb the hair of the user.

A further object is to provide the frame of an eyeglass unit or set with a hair comb which can be coupled to one of the temple bars, and removed from the temple bar without detaching the temple bar from the eyeglass frame.

With the above and other objects in view the invention relates to certain new and useful constructions, combinations and arrangements of parts, clearly described in the following specification and fully illustrated in the accompanying drawings, in which:

FIG. 1 is a side view of a temple bar, partly in longitudinal section, showing the hair comb in the pocket of the temple bar.

FIG. 2 is a vertical sectional view, taken on line 2—2 of FIG. 1, looking in the direction of the arrows.

FIG. 3 is a front elevation of the sunglasses.

FIG. 4 is a side elevation of a temple bar having comb teeth formed on the same.

FIG. 5 is a top edge view thereof, showing the detachable hinge connection thereof.

FIG. 6 is a top edge view of a temple bar provided with lateral lugs on which a comb is mounted.

FIG. 7 is a cross sectional view of a temple bar having a U-shaped construction, which receives a comb of a mated construction.

Referring to the drawings, and particularly, FIGS. 1, 2 and 3, 10 designates the front section of a sunglass frame, having light filtering glasses or lens pieces 11 and 12 fitted in the usual openings 11a and 12a of this frame.

The central frame section 10 is provided on each end with a temple bar supporting extension or lug 13 to which a temple bar 14 is pivotally connected by any suitable hinge construction, so that the temple bar can fold on the central frame section 10.

One of these temple bars 15 is shown to have a longitudinal pocket 16, which is obtained by making the temple bar of tubular construction, to provide a pocket or chamber adapted to snugly receive the hair comb 17. This comb is formed with a longitudinal bar 18 having integral comb teeth 19, and a rear end handle 19a, which is curved to fit the ear of the user, when the comb is fully inserted in the pocket 16. The comb snugly fits in the pocket and the walls of this pocket are adapted to have a spring clutching action on the comb when it is fitted in the pocket, so that when inserted in the pocket the rear end of the comb functions as a normal ear hook for the temple bar.

It will be understood from the foregoing that articles other than a hair comb may be removably stored or concealed within the pocket or chamber 16 which is formed in the temple bar.

In FIG. 7 another temple bar 35 is shown, which is of U-shaped construction, in cross section, to provide a longitudinal pocket 35a with divergent side walls 35b. In this pocket the hair comb 36 is snugly fitted and this comb is provided with a rear end handle which provides the ear hook for the temple bar.

In FIGS. 4 and 5, I show a modified construction, which includes a temple bar 25m having a series of lateral hinge eyes 26, adapted to have an interfitting engagement with a mating set of hinge eyes formed on the end of the main central frame 10. The engaged hinge eyes are coupled by a pivot pin 27. By withdrawing this pin the temple bar may be detached from the central frame of the eyeglasses. The temple bar 28 is formed with a series of comb teeth 29, which may be of any size and number, within the capacity of the stock of the temple bar. The rear end of the temple bar is formed with the usual ear hook 30, which forms the handle of the comb.

In FIG. 6, I show a temple bar 31, having lateral lugs 32 formed integral with the bar, or attached thereto, on which the upper longitudinal bar 33 of the comb 34 is mounted, this comb bar being formed with holes or sockets 33a to receive the lugs. The wall of each socket may be split radially so that the socket edge will have a yielding clutching action on the lugs. By detaching this comb from the lugs the comb may be used without interfering with the normal use of the temple bar, which remains complete at all times.

For those persons who are not provided with pockets or purses to carry a hair comb or otherwise do not carry such an article, they can by means of this invention have at their disposal a comb combined with useful sunglasses to change or correct any disordered condition of their hair.

It is understood that various changes and adjustments may be carried out without departing from the scope of the invention, as defined by the claims hereof.

Having described my invention, I claim as patentable:

1. An eyeglass frame having a central frame provided with lenses and temple bars, one of the temple bars having a longitudinal pocket open at its rear end and a hair comb snugly fitted in the pocket and having a curved rear end projecting rearwardly from the open end of the pocket and forming a handle for the comb when it is withdrawn from the pocket and an ear hook for the temple bar when it is seated in the pocket and worn on the head of a user.

2. An eyeglass frame having a temple bar provided with a U-shaped construction forming a longitudinal pocket opening along the upper and rear longitudinal edges thereof, and a hair comb snugly fitted in the pocket and withdrawable therefrom and provided with a curved rear end projecting rearwardly from the open rear end of the pocket and forming a handle for the comb when the comb is withdrawn from the pocket and an ear hook for the temple bar when the comb is seated in the pocket.

References Cited

UNITED STATES PATENTS

| 2,555,578 | 6/1951 | Davis | 351—52 |
| 3,038,376 | 6/1962 | Kancepolsky | 351—157 |

DAVID H. RUBIN, *Primary Examiner.*